(No Model.) 2 Sheets—Sheet 1.

A. A. SPRAGUE.
RAILWAY STATION SIGNAL.

No. 317,590. Patented May 12, 1885.

Witnesses,
Geo. H. Strong
J. A. Rouse

Inventor,
A. A. Sprague
By Dewey & Co.
Attorneys (No Model.)  2 Sheets—Sheet 2.

A. A. SPRAGUE.
RAILWAY STATION SIGNAL.

No. 317,590. Patented May 12, 1885.

Witnesses,
Geo. H. Strong.
J. H. Rourke.

Inventor,
A. A. Sprague
By Dewey & Co.
Attorneys

UNITED STATES PATENT OFFICE.

ARTHUR AUGUSTUS SPRAGUE, OF SAN RAFAEL, CALIFORNIA.

RAILWAY-STATION SIGNAL.

SPECIFICATION forming part of Letters Patent No. 317,590, dated May 12, 1885.

Application filed February 20, 1885. (No model.)

*To all whom it may concern:*

Be it known that I, ARTHUR A. SPRAGUE, of San Rafael, Marin county, State of California, have invented an Improvement in Railway-Station Signals; and I hereby declare the following to be a full, clear, and exact description of the same.

My invention relates to a station-signal whereby passing railway-trains may be signaled.

It consists of a case supported upon an arm which projects from the side of the station, building, or other convenient point, one end of the case being formed with opaque sides and the other end having transparent glasses in the sides, so that a light which is set within that end may be seen from both sides and the end. The opposite end contains a frame-work having colored glasses or lenses set therein, and this is operated by a mechanism connected with the interior of the office. In connection with this lamp I employ similarly-colored signal boards or targets, which are also connected with the same operating mechanism, so that they will be moved in conjunction with the lenses.

Figure 1:
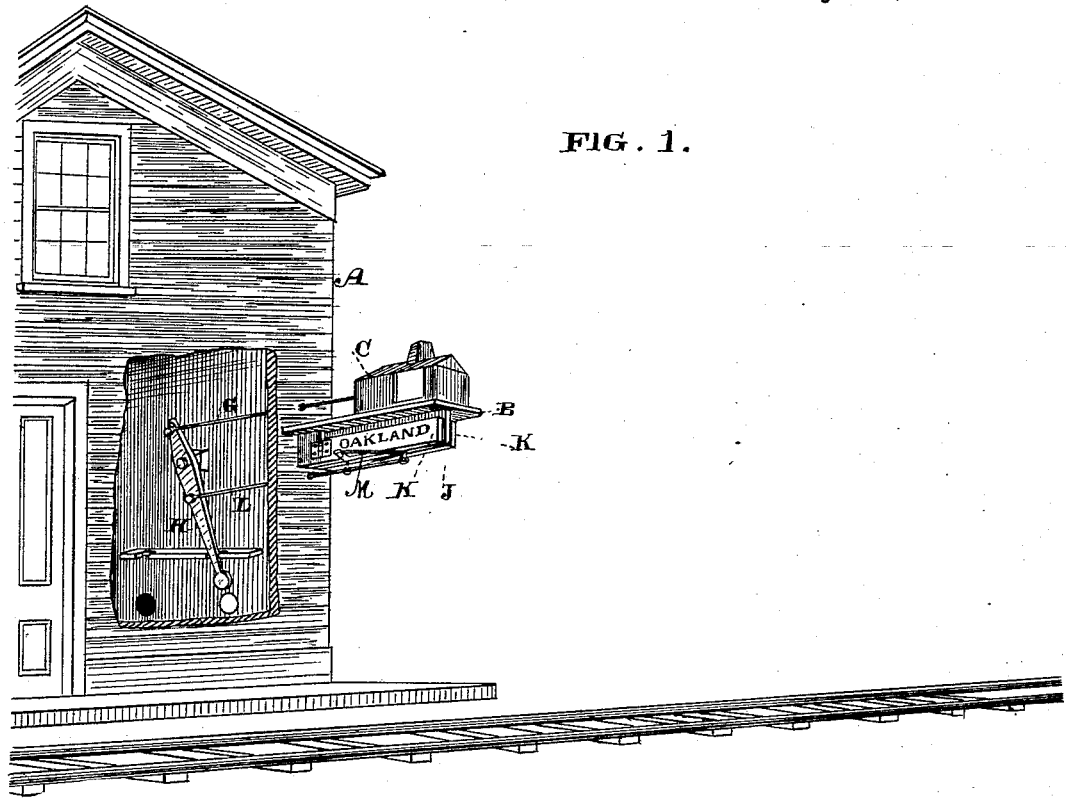
Figure 2:
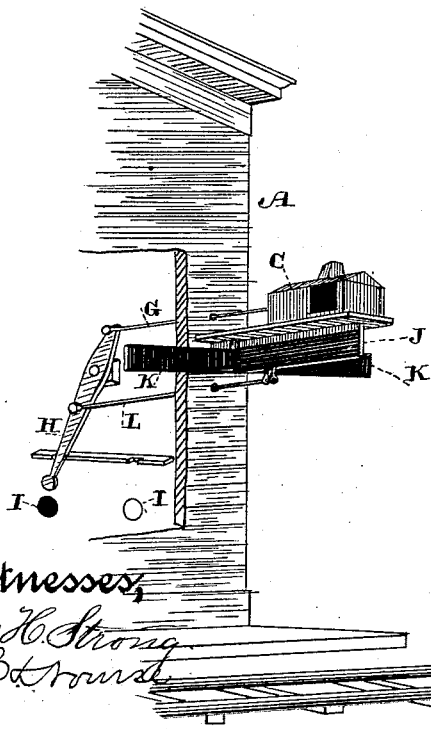
Figure 3:
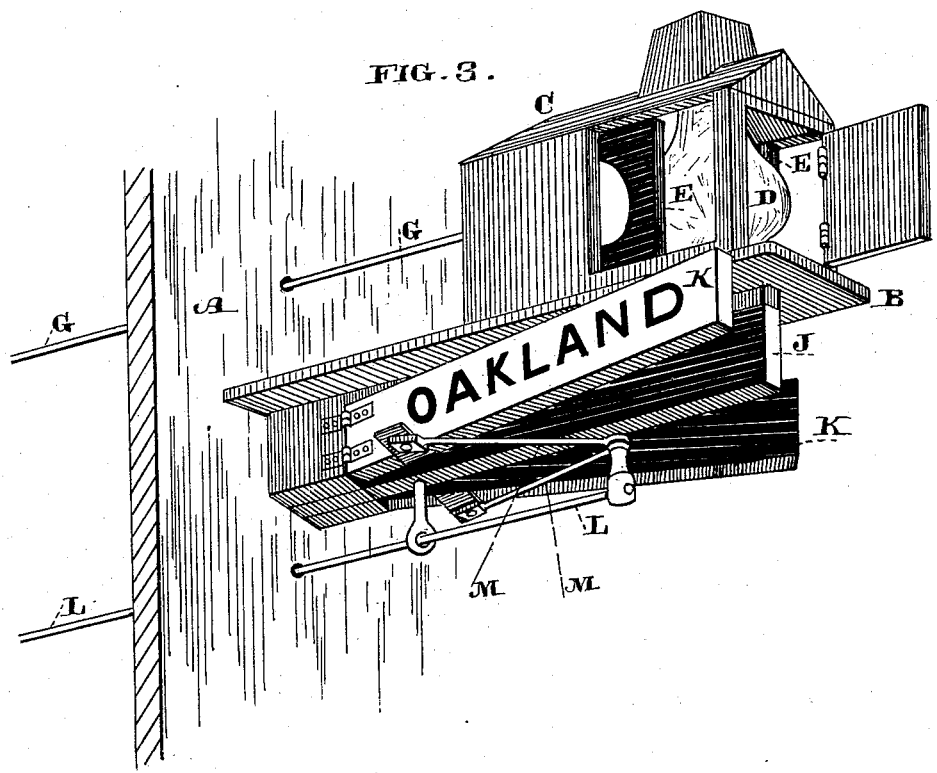
Figure 4:
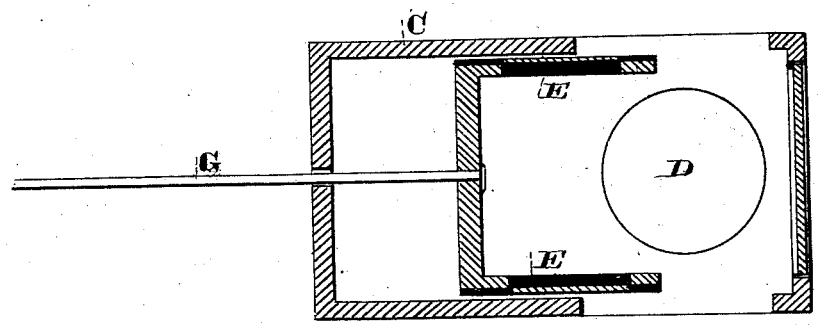

Referring to the accompanying drawings for a more complete explanation of my invention, Figure 1 is a view of my apparatus, showing the signal in a position to allow the train to pass. Fig. 2 shows the apparatus in position to stop a train. Fig. 3 is an enlarged perspective view of the device. Fig. 4 is a plan of the same.

A is the side of the station-house, a post or other suitable structure from a projecting arm, B, and may extend horizontally outward toward the track of the railway. Upon this arm is supported a case, C. The outer end of this case has open sides with transparent glasses fixed in them, and a lamp, D, may be placed in this portion of the case, so that its light can be seen along the line of the track from either direction, and it may also be seen from the end of the case, which is also glazed. The end may be in the form of a hinged door, which can be opened for the ready inspection and adjustment of the lamp within. The opposite end of the box or case C has close opaque sides and ends, as shown.

Within the box a frame-work, E, is fitted to travel freely, so that it may be moved from end to end of the box. It is preferably mounted upon small wheels or rollers, so as to travel easily, and it has fixed in its sides two colored glasses or lenses, so that when this traveling frame is moved forward it passes upon each side of the stationary lamp and the lenses cover the white glass from the interior, so that the only light seen will be colored. This frame-work with its lenses is caused to travel back and forth within the lamp-case by means of a rod or arm, G, which connects with the upper end of a lever, H, fulcrumed to some convenient point within the station-building, preferably within reach of the station-agent or telegraph-operator.

The lower end of the lever may have a disk or target attached to it, and the wall along which it moves has two circular marks, I, formed upon it, one being white and corresponding with the white glass in the lamp-box, and the other being colored to correspond with the movable lenses. When the lever is moved so that the disk upon its lower end stands opposite the white mark, it will show that the white light is exposed and the colored lenses concealed. When the lever is moved so that the disk stands opposite or over the colored mark, it will indicate that the colored lenses have been moved forward so that the colored light is thrown along the line of the track.

In order to provide a corresponding daylight-signal, a board, J, of sufficient width projects below the arm which supports the lamp-case, and this board is painted the same color as the lenses. Upon each side of this board another board, K, is hinged, so that they may be opened outwardly from it in each direction, and stand at right angles with it; or they may be closed together, so as to entirely cover it. The outer faces of these hinged boards are painted white, and may have the station name upon them, if desired. The inner faces are painted of the same color as the station-signal. In order to operate these hinged wings, a rod, L, is connected with the lever H inside the station-house below the fulcrum, and extends out horizontally beneath the colored signal-board, having suitable guides, within which it moves so as to keep it in proper line. To this rod the inner side of two other rods, M, are pivoted or hinged, while their outer or opposite ends are pivoted to the hinged wings or boards near their hinges. From this construction it will be seen that when the lever is moved, so as to push the rod outward the hinged wings will be closed against each side of the colored signal-board, so as to entirely cover and conceal it, and when the rod is drawn back it operates through the connecting-rods M to swing the wings back until they stand at right angles with the signal board or target. The movement of these wings is simultaneous and corresponding with that of the colored lenses in the lamp-case, so that when the lenses are projected forward to produce a colored light the wings will be swung outward, so as to expose the signal board or target, and when the lenses are withdrawn so as to expose the white light the hinged wings will be closed upon the colored signal board or target, so as to entirely conceal it and leave their white outer sides exposed to correspond with the white light, which will be exposed in the lamp-case.

By this I simplify the mechanism which is necessary for operating the station-signal, no gears, weights, or springs are necessary, and the operation of the whole device is positive, while the exact position of the parts is indicated by the glasses at the lever by which they are operated within the office.

I am aware that a combination of colored signal lights and targets have been employed for stations, the light being changed either by turning or varying its position, and also that such signals and lights have been employed where both colors can be seen by the train-men at all times, so that they must depend upon the position of the signal to determine whether to stop or not. In my device only one signal can be seen at one time, the other being entirely covered and concealed. By moving the lenses inside of the lamp-case they will never be affected by snow or sleet, so as to render them dim.

Having thus described my invention, what I claim as new, and desire to secure by Letters Patent, is—

1. In a station-signal, a colored board or target supported horizontally at right angles from the railway-track, in combination with wings hinged at one end upon either side of the colored target, and having a mechanism connecting with a lever inside of the station-house, whereby the wings may be opened to expose the signal or closed to conceal it, substantially as herein described.

2. In a station-signal, a horizontally-supported colored board or target, the supplemental wings hinged upon opposite sides of said target, a rod connecting with a lever so that it may be moved out parallel with and beneath the target, and the rods M, connecting it with the hinged wings, whereby they may be opened and closed, substantially as herein described.

3. In a station-signal, a horizontally-supported lamp-case having the colored lenses constructed to move so as to cover or expose the lamp, a similarly-colored signal board or target corresponding with and placed below the lamp-case, in combination with a lever swinging upon its fulcrum-pin within the station-house, having its upper end connected with the lenses within the lamp, and its lower end connected with the hinged wings, whereby the signal-target may be exposed simultaneously with the colored light, and concealed at the same time when the colored light is concealed, substantially as herein described.

4. In a station-signal, a lamp-case containing movable colored lenses, and a similarly-colored signal board or target with hinged wings upon opposite sides, a means for opening and closing said wing to expose or conceal the target simultaneously with the exposure or concealment of the colored lenses, a lever within the station-house by which the two are simultaneously operated, and correspondingly-colored disk or marks at the opposite ends of its travel, whereby the position of the signal may be indicated, substantially as herein described.

In witness whereof I have hereunto set my hand.

ARTHUR AUGUSTUS SPRAGUE.

Witnesses:
A. L. HAM,
JNO. ARMSTRONG.